United States Patent [19]

Homer

[11] Patent Number: 4,836,937

[45] Date of Patent: Jun. 6, 1989

[54] SYSTEM FOR REMOVING LIQUID FROM A SLURRY OF LIQUID AND POWDERED MATERIAL

[75] Inventor: John C. Homer, Chardon, Ohio

[73] Assignee: General Signal Corporation, Stamford, Conn.

[21] Appl. No.: 835,911

[22] Filed: Mar. 4, 1986

[51] Int. Cl.[4] ........................ B01D 29/36; B01D 37/00

[52] U.S. Cl. .................................... 210/808; 100/107; 210/350; 210/406; 210/416.1

[58] Field of Search ................................ 100/107–109, 100/102, 113–116; 210/289, 291, 350, 351, 189, 767, 808, 416.1, 406

[56] References Cited

U.S. PATENT DOCUMENTS

| | | | |
|---|---|---|---|
| 3,180,825 | 4/1965 | Couvreur et al. | 210/350 |
| 3,448,859 | 6/1969 | Hall et al. | 210/436 |
| 3,965,000 | 6/1976 | Mikule et al. | 210/351 |
| 4,092,247 | 5/1978 | Madsen | 210/416.1 |
| 4,337,153 | 6/1982 | Prior | 210/350 |
| 4,385,557 | 5/1983 | Hartmann | 100/107 |
| 4,461,710 | 7/1984 | Erickson et al. | 210/189 |

*Primary Examiner*—Ivars Cintins
*Attorney, Agent, or Firm*—M. L. LuKacher; J. S. Mednick

[57] ABSTRACT

In order to remove liquid from a slurry of water and powdered material, and particularly from a slurry containing spent powdered ion exchange resins and other media used to decontaminate water in nuclear power plants, a vessel is filled with the slurry. The vessel contains filters, particularly panels which are arrayed in the upper portion of the vessel and through which water is filtered leaving a body ("cake") of the powdered material in the vessel. The filters are surrounded on at least their sides and top by a bag of pliant material. This bag defines a variable volume region and may be evacuated to compress the cake against the filters, prevent breaking suction at the filters and enabling them to continue to remove the water remaining in the cake so that additional water may be removed from the cake and discharged from the vessel, leaving a compact mass which efficiently utilizes the volume of the vessel, thereby preparing the vessel and the dewatered slurry for disposal.

26 Claims, 5 Drawing Sheets

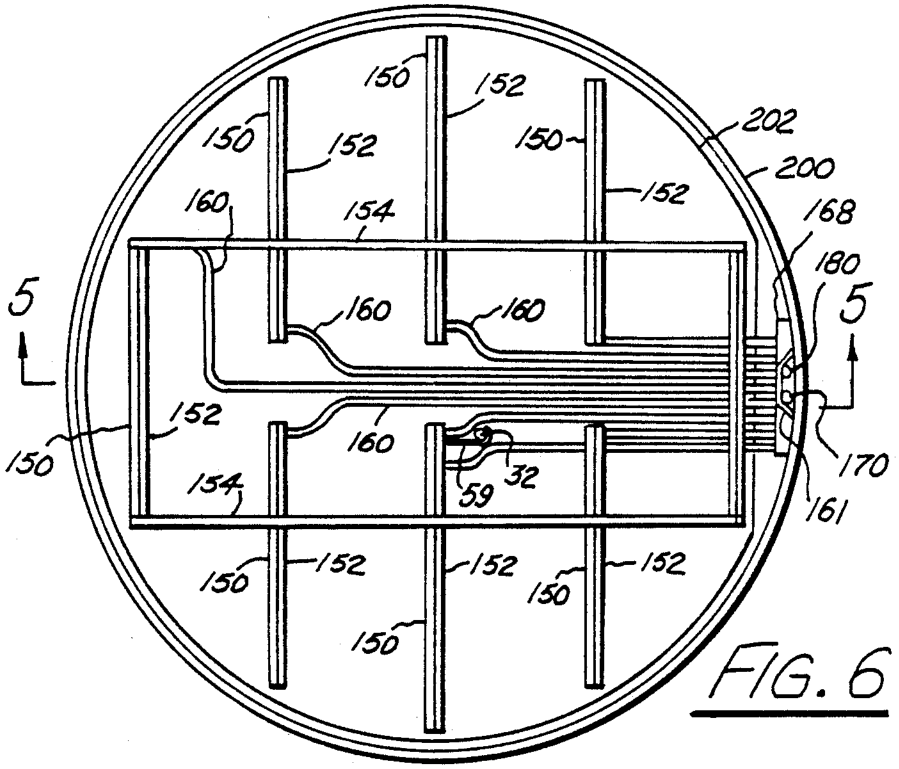
FIG. 6
FIG. 7
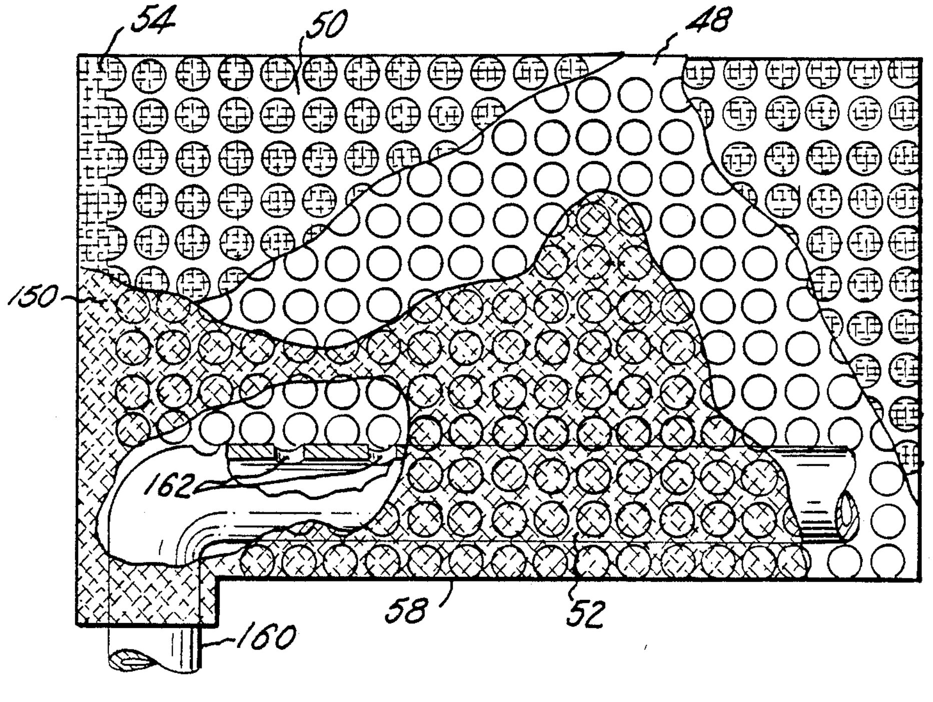

SYSTEM FOR REMOVING LIQUID FROM A SLURRY OF LIQUID AND POWDERED MATERIAL

The present invention relates to a system (method and apparatus) for the removal of liquid from slurrys of liquid and powdered material, and particularly for the dewatering of slurrys of ion exchange resin powders, filter media and other powder material which may emit low level radiation after use in the conditioning and decontamination of water in nuclear power plants.

The invention is especially suitable for use with powdered material slurrys and sludges. The invention is applicable wherever a body of the material from which the liquid to be removed is compressible. Accordingly, the term called "powder" when used herein should be taken to mean other particulate material bodys of which are compressible, and sludges as well as slurrys of such powder and other compressible material.

Powdered media, such as ion exchange resins used in water treatment and in filtering applications in nuclear power plants contain radioactive ions and other materials. After they are used and spent, these media must be disposed of in a volume efficient manner, since the cost of disposal is based upon the volume of the disposal site which is utilized. Accordingly, water must be removed from the slurry to prepare the spent powder for disposal. Dewatering of radioactive powder slurrys must be accomplished to reliable free standing water limits to meet governmental regulations. Slow dewatering processes are undesirable, since they subject personnel to a higher risk of exposure.

It is desirable that the water be removed in a container, known as a cask liner, since the container, which may be a steel drum, lines a lead cask which provides a shield against nuclear radiation emitted from the contained material. It is desirable that the slurry be dewatered within the liner and disposed of together with the apparatus within the liner (the container's internals).

Heretofore, spent powdered media slurrys have been dewatered through the use of a multiplicity of filter banks distributed within the liner. The water is filtered through these banks and removed, but with varying degrees of success since the powder may blind the filter's surfaces. A large volume of the container has been occupied with filter cartridges, thereby occupying more of the volume of the container than is desirable. In short, the volume efficiency of containerization has been low. Filters located at the bottom of the liner have a greater tendency to blind off with some powdered materials, and may be useless without reverse flushing or chemical treatment processes.

Even virgin powdered ion exchange resin in its "as received" condition consists of from 58% to 60% water by weight. This water may not be free water, but rather water bound within the resinous structure. Even after a long period of filtering, with vacuum applied to the filters for withdrawing the water, it is found that conventionally dewatered powder resin exceeds 72% to 78% water by weight. Such resin will continue to release free water by simply draining over time, which is undesirable because of the wasted volume of the disposal container occupied by water, and because free standing water in the container is undesirable for environmental protection reasons.

During vacuum filtration, the removal of water increases until a body of material (cake) forms about the filter surfaces. As filtration continues, the cake shrinks and sufficient stress is developed at the filter surfaces which causes the cake to suddenly break free of the filter elements. When the crack develops, it rapidly progresses to the surface of the cake, permitting the free flow of air to the filters and breaking suction at the filters. When this occurs all flow of water ceases. The loss of suction (the water seal at the filter surfaces) has conventionally been accepted as the end of filtering. The cake, however still contains water, usually at the 72%–78% by weight level, which water can be released over time.

It has been found in accordance with the invention that the seal at the filters can be maintained by compressing the body (the cake) so that the discharge of water can be continued and the cake can be dewatered to less than as received condition, for example 53% by weight water as against 58 to 63%. An additional advantage is that the filter surface area may be increased, without increasing the volume of the liner occupied solely by filer media. This enables a large area of filter surface per unit volume of powder slurry thereby increasing the rate of dewatering. Also the filters can occupy much less of the volume of the container than is occupied by compacted, dewatered powder; thus, making the disposal process more volume efficient.

Accordingly, it is the principal object of the present invention to provide an improved system (methods and apparatus) for the removal of liquid from slurrys of liquid and powdered media and particularly the sort of slurries of spent powdered media, obtained from nuclear power plants from water treatment and decontamination processes.

It is a further object of the present invention to provide an improved system for the compacting of powdered media slurrys, by the removal of water therefrom within a container to an extent greater than possible with vacuum filtration alone.

It is a further object of the present invention to provide an improved system for the dewatering and preparation for disposal of ion exchange resin powders, powdered filtered media and slurrys containing powders which are produced in the operation of nuclear power plants.

It is a still further object of the present invention to provide an improved system for the preparation of powdered spent ion exchange resins and other powder media for disposal with high volume efficiency.

It is a still further object of the present invention to provide an improved system for the dewatering, compacting and containerization of slurrys of powder material all of which can be accomplished, rapidly within a container which is filled with the slurry.

Briefly described, the invention removes liquid such as water from, and compacts, a slurry of liquid and powder in a vessel by forming a body, such as a cake of the material, upon a filter through which the liquid is withdrawn, as by vacuum filtration. The body is compressed, preferably in a direction toward the filter, thereby maintaining a liquid seal and preventing the breakage of suction so that the liquid can continue to be withdrawn. The compression is preferably carried out, in accordance with the invention, by reducing the volume in the region surrounding the filter. A bag of pliant material is disposed in the container around the body or cake. The bag is evacuated thereby compressing the cake against the filter, maintaining the liquid seal and allowing the continuation of liquid discharge. The dewatering continues until substantially all the water, except that which is bound within the structure of the powder, is removed. The space in the vessel within the bag left after the cake is compressed can be filled with additional slurry and the process repeated thereby utilizing the volume of the vessel efficiently in holding deliquified slurry.

The foregoing in other objects, features and advantages of the invention as well as the presently preferred embodiment thereof and the best mode now known for practicing the invention, will become more apparent from a reading of the following description in connection with the accompanying drawings in which:

FIG. 1 is a schematic diagram illustrating a system for dewatering a slurry of powered resins. These are particles having an average particle size of from 30 to 50 microns. They may be slurries of powdered media used for water treatment and filtering in nuclear power plants. Such powder media are sold under the trade names "Powdex," "Ecodex" and "Epifloc";

FIG. 6 is a sectional plan view taken along the line 6—6 in FIG. 4; and FIG. 7 is a fragmentary view illustrating a typical connection of a discharge tube to the edge of one of the panels of the vessel or container internals illustrated in FIGS. 4, 5 & 6.

Figure 1:
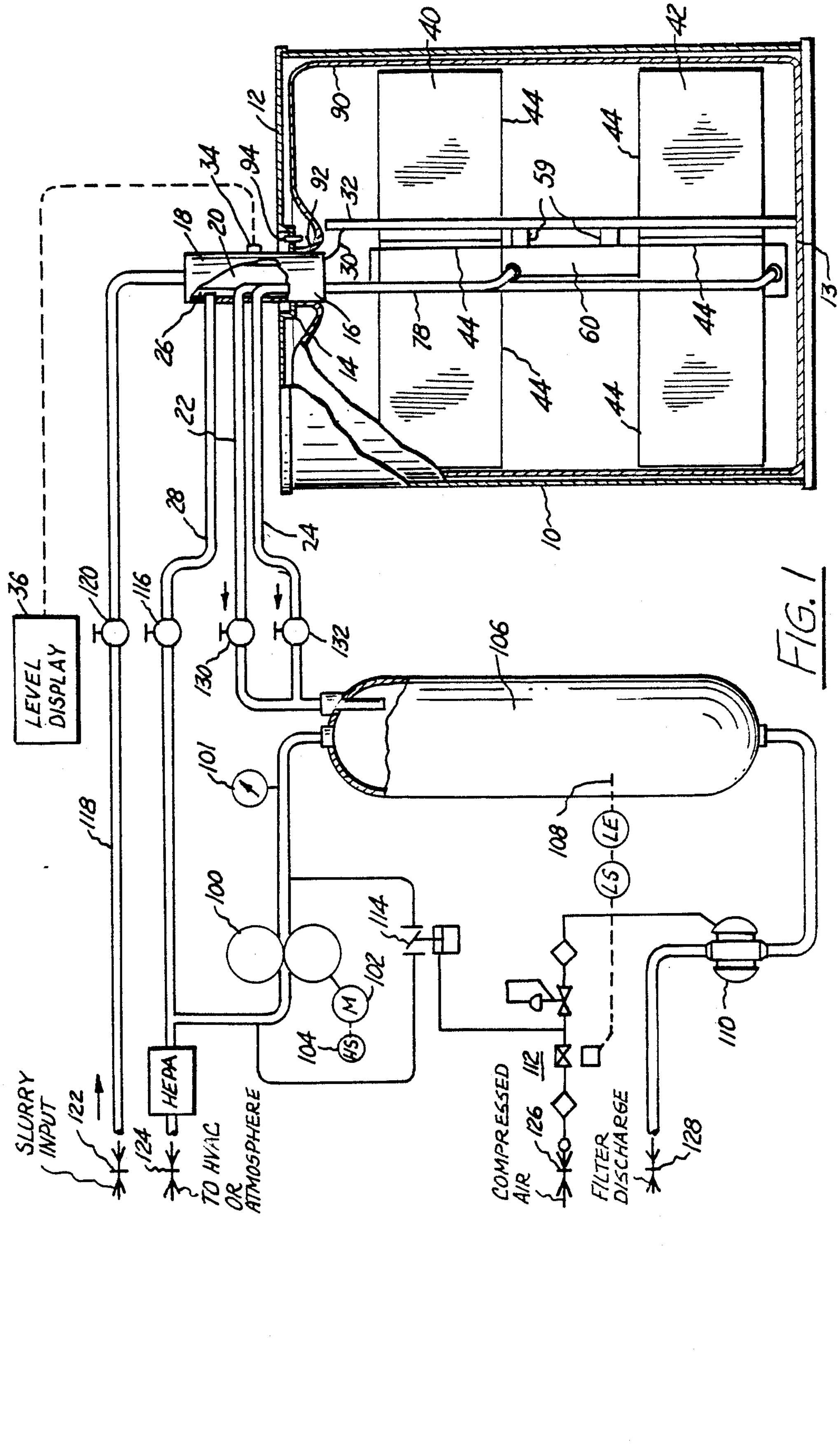

Referring first to FIG. 1, there is shown a drum or liner vessel 10 which may be a steel drum. The illustrated drum is a typical 55 gallon drum. This system may also be used with larger drums, for example, from 170 to 200 cubic foot capacity. This drum may be the liner of a cask of lead in which it is transported to a disposal site where the drum is removed from the cask (after it is filled with dewatered powder media) and buried.

The top 12 of the drum 10 has an indentation which carries a plate 14. A connector (a ring) 16 is located in an opening in the plate. This connector receives a nozzle 18 carrying a fill tube 20 and discharge tubes 22 and 24. The annular space 26 around the fill tube within the nozzle communicates with the inside of the drum through the connector ring 16. A vent tube 28 is connected through the wall of the nozzle 18 into this space 26 and communicates with the inside of the drum 10. An electrical conductor cable 30 from a level sensor probe 32, which is part of the containers internals and is disposable with the container 10, passes through the ring 16 and the nozzle 18 to a connector or plug 34. A level display 36 converts the output of the level probe which is an electrical parameter which varies with the level of the slurry in the drum 10, into a human readable display, for example, a light emitting diode (LED) display of the type which is commercially available.

The level probe is a tube or rod of conductive material which is sealed at its bottom by a insulating jacket, for example, a polyvinyl chloride (PVC) jacket which is shrink-fitted over the tube. This tube is shown at 33 and the jacket is shown at 31 in FIG. 2. The tube 33 is closed at its bottom and top end by the jacket. The sensor probe has a capacitance which varies in accordance with the level of the slurry in the vessel 10. This level is displayed, for example, by a number which indicates percent of the vessel's volume which is full, on the display 36. Further information respecting the design of the level probe 32 and the circuitry for obtaining outputs representing the level in the vessel 10 may be obtained with reference to U.S. patent application Ser. No. 833,942, filed Feb. 26, 1986, in the name of John C. Homer and assigned to the same assignee as this application. Briefly, the capacitance presented by the probe 32 is converted into a voltage which varies in accordance with the level of slurry in the vessel 10. This voltage is converted into a digital number, using a counter which counts during repetitive cycles on each of which the capacitor is charged and the voltage is obtained. The count registered in the counter is a multibit digital signal which drives the LED display 36.

The nozzle and the tubes connected thereto may be attached to the ring connector 16 for filling the drum 10 with the slurry and while dewatering the slurry. When the dewatered slurry fills the vessel 10, the nozzle 18 is disconnected and a cover (not shown) is screwed or press fitted into the depression 14 to seal the top 12 of the vessel 10. The filled vessel with all of its internals is then transported to the disposal site and buried.

The internals of the vessel include, in addition to the level probe 32, a top and bottom array 40, 42 of filter panels or fins. While a top array 40 and a bottom array 42 are shown, only one array, preferably the top array 40, need be used. Each array includes a plurality of radially disposed filter panels or fins 44. Four of such fins are used in the arrays 40 and 42 shown in FIG. 1. Additional fins, for example, eight filter panel fins 46 may be used, as shown in the embodiment of the filter unit shown in FIG. 2. The filter panel fins are vertically disposed and provide a large area of filter surface. Preferably the filter panels have an area such that they present one square foot of area per cubic foot of slurry with which the vessel 10 is filled.

The filter panels 44 are preferably provided by sheets 48 and 50 of honeycomb plastic material. These sheets have bulbous portions which are connected by webs. The bulbous portions are offset in the adjacent sheets so as to provide a substantially clear water path through the core of the panel; the core being provided by the sheets 48 and 50. Other structures may be used for the panels' cores. Such structures will provide a maze of paths and may, for example, be foams having large, interconnected interstices. The filtering action is provided by a fabric covering 52 and 54 which may consist of sheets, which are preferably of porous material, such as polypropylene which is heat sealed along rims 56 and 58 along the top and bottom edges and the outer ends 61 of the panels (see FIG. 3). The fabric covering is sealed along all of its edges in case of the filter panels used in the embodiment of the invention shown in FIGS. 4–7 (see especially FIG. 7).

Figure 2:
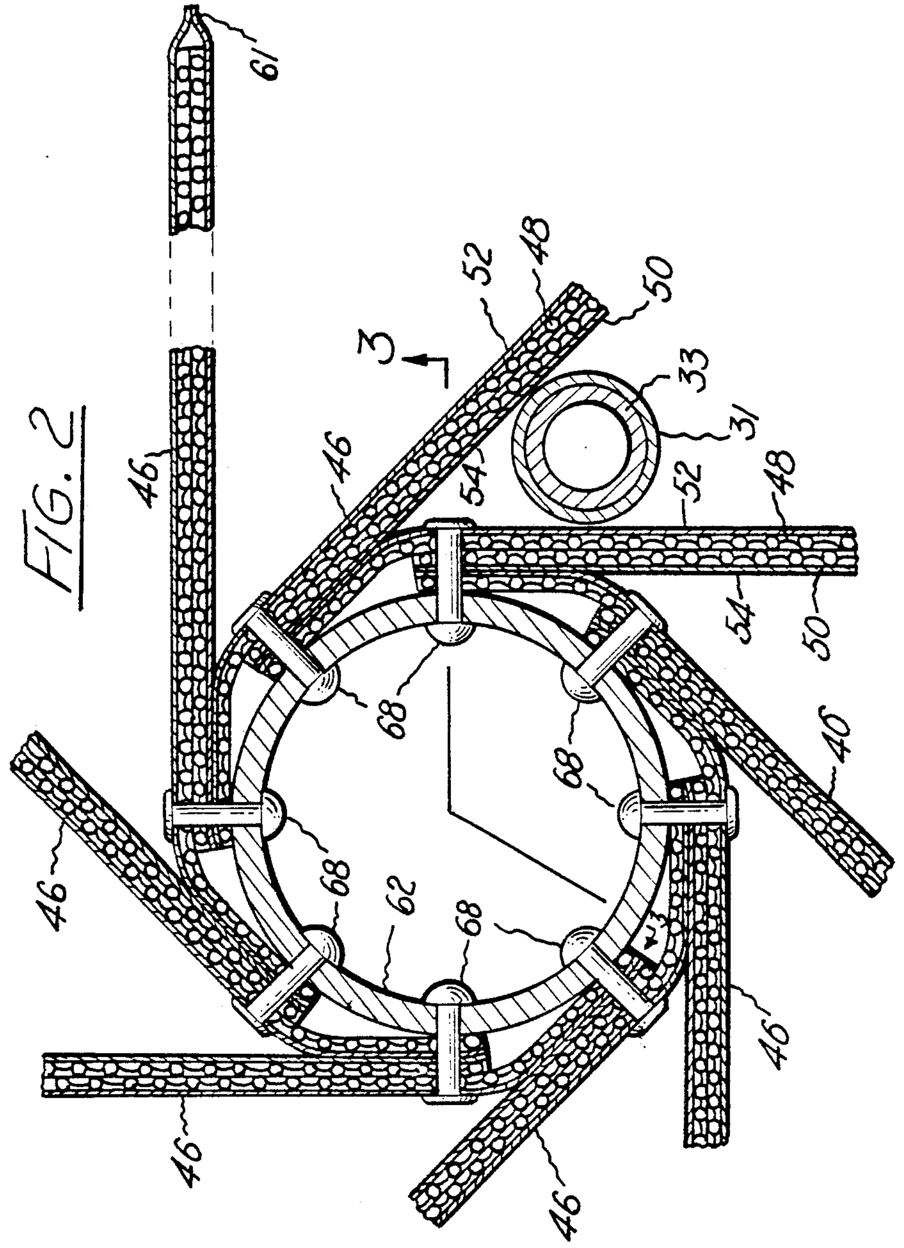
FIG. 2 is a fragmentary sectional plan view through a filter array unit which may be used in one of the filter arrays located in the drum or liner vessel illustrated in FIG. 1.
Figure 3:
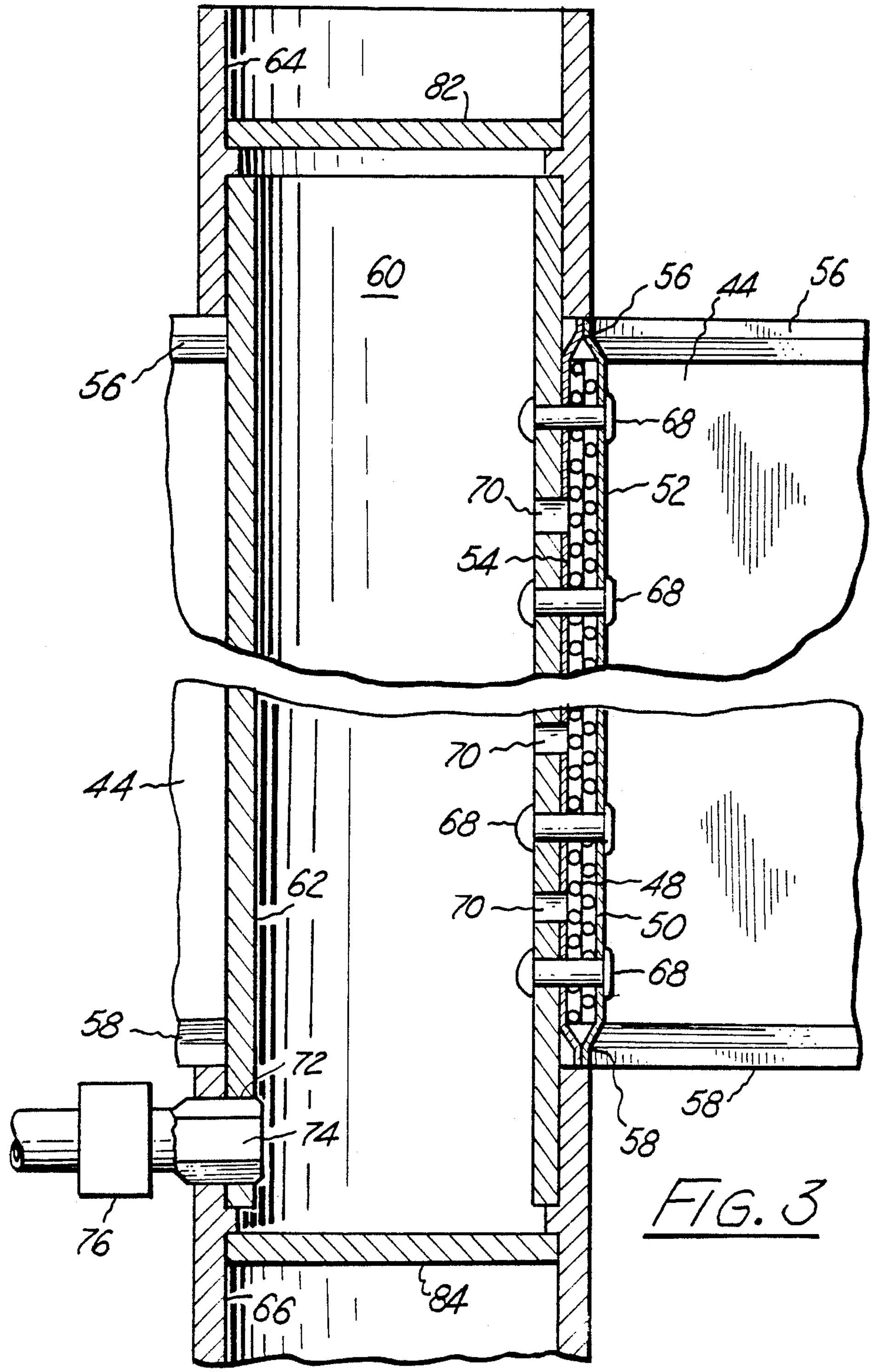
FIG. 3 is a fragmentary sectional view taken along the line 3—3 in FIG. 2, but with a modified panel or fin construction.

The panels are flexible and bendable so as to be spirally wound into a compact generally cylindrical assembly of diameter reduced from the diameter of the assembly when the panels are released and spring radially out to the positions shown in FIGS. 1, 2 and 3. The ability to collapse the flexible radial fins in a spiral-like fashion is important so as to provide a reduced diameter assembly which can be inserted through a manway (hole) of a liner, for example, an existing, empty liner. For example, a 170 cubic foot liner of conventional design is 72" in diameter and is equipped with a 22½" diameter manway in its top head. The filter assembly when the fins 44 or 46 are in extended position, would be approximately 68" in diameter. The flexible, vertically oriented radial fins can be collapsed in spiral fashion and held in a reduced diameter cylinder, for example, by a cloth belt wrapped around the medium of each array of fins. The assembly can then be introduced to the liner through the manway and the radial filter fins deployed when the belt is cut or removed. Accordingly, existing liners may be retrofitted with internals so as to provide apparatus for the dewatering of slurries in accordance with the invention.

The arrays 40 and 42 of fins 44 are assembled to a central pipe or standpipe 60. This pipe rests on the bottom 13 (which may be slightly conical) of the drum 10 at the center or apex of the conical bottom 13. The assembly is centered by the fins 44 and will be supported by the dewatered body or cake which is accumulated during dewatering operations. The level probe may be attached and supported by the pipe 60, using brackets 59. The pipe 60 may be plastic, such as PVC pipe which comes in a plurality of sections which are coupled (screwed or glued) together. The section which supports the top filter fin array 40 and the section which supports the bottom filter fin array 42 may be identical. Each includes a pipe section 62 having coupling sections 64 and 66 at the ends thereof. The coupling section 66 may extend and be connected, as by gluing with any appropriate cement to a pipe section similar to the section 62 which supports the bottom filter fin array 42.

The filter fins are attached to the wall of the pipe by a plurality of rivets 68. A plurality of filtrate discharge holes 70 are disposed between the rivets and communicate with the panels 44 or 46 through the porous fabric sheets 54 on the inside thereof. In the case of the eight fin array shown in FIG. 2, the communication is between one of the core plates 48 which is longer than the other core plate 50 and is sandwiched between the pipe section 62 and the panel 46 adjacent thereto. A fluid path is provided through the filters and the holes 70 into the pipe section 62. This pipe section 62 has an opening 72 which receives a coupling tube 74. This tube 74 is connected, for example, through a coupling 76 to tube sections 78 and 80 which extend into the coupling ring 16. The filtrate tubes 22 and 24 are connected to the bottom filter array discharge tube 80 and the top filter array discharge tube 78 when the nozzle 18 is inserted into the connector 16.

Disks 82 and 84 seal the top and bottom of the pipe section 62 of each array 40 and 42. The slurry can be dewatered by vacuum filtration through the filter panel arrays 40 and 42, the pipe 60 and the filtrate discharge tubes 22, 24, 78 and 80.

Vacuum filtration can only achieve partial dewatering of the slurry, for example, from 72% to 78% removal of the water retained in the powder. The process is limited by the shrinkage and cracking in the cake which rapidly progresses to the surface of the cake at the filters, permitting free flow of air from the vent to the filters and terminating vacuum filtration.

In accordance with the invention, the container internals include a bag 90 of pliant material which surrounds the filter fin arrays 40 and 42. This bag defines a variable volume region around the cake body and the filter fin arrays. The bag may extend across the bottom 13 of the tank, as shown in FIG. 1 or may be sealed along the side walls of the tank below the bottom filter fin array 42. The neck 92 of the bag is sealed to the connector ring 16. There is a space between the cover 12 and the top of the bag which is vented to the atmosphere, preferably with a porous plug 94. The bag 90 may be of any pliant and nonporous material. Preferably a plastic material such as polyethylene may be used. The bag is used to compress the cake against the panel fins of the filter units as vacuum filtration reaches its limit. The compressed cake maintains the fluid seal at the filters, which would otherwise be broken by cracking of the cake, and allows vacuum filtration to continue. Additional dewatering can go on until the remaining cake is dewatered even to less than "as received condition", for example, 53% water as opposed to 58% to 63% water. This is not free-standing water but water within the resinous material structure. Accordingly, the dewatering process is reliable in the water limits reached. There is therefore assurance that the remaining free-standing water will meet the requirements of government regulations. An additional advantage is that, once the cake is compressed, room is left within the bag for additional slurry. Accordingly, the additional slurry may be admitted to the vessel and the dewatering cycle repeated until substantially the entire volume of the vessel 10 is utilized, thereby enhancing the volume efficiency of containerization and the disposal process.

The dewatering equipment used with the apparatus consisting of the vessel 10 and its internals is shown in FIG. 1. The major components are a blower or vacuum pump 100 (e.g. a rotary vane blower capable of generating a current of high velocity air, for example, at the rate of 300 cubic feet per minute which is driven by a motor 102 controlled by a hand switch (HS) 104. The vacuum pump is connected to the top of a water separation reservoir tank 106 and its pressure monitored by a gauge 101. This tank is equipped with a level element 108 (LE) which is electrically connected to a level switch (LS) which provides an electrical signal for turning on and off a positive displacement pump, preferably a diaphram pump 110.

The pump 110 is a compressed air operated pump which is turned on by conventional valves and controls illustrated at 112. When the diaphram pump is turned on, compressed air is also introduced to open a by-pass valve 114 which reduces the pressure developed by the vacuum pump 100 to less than 15" of mercury, and allow both pumps 100 and 110 to operate at the same time. This pump may be a rotary vane pump which is capable of generating a current of high velocity air, for example, at the rate of 300 cubic feet per minute. The return side of the vacuum pump is connected to the vent pipe 28 through a valve 116. The return side and the vent pipe 28 may be returned to the heating, ventilating and air conditioning (HVAC) return of the facility or to the atmosphere through a HEPA (high efficiency particle filter).

The slurry input, which may be from a slurry holding tank, is connected through an inlet pipe 118 and a valve 120 to the fill pipe 20 in the nozzle 18. The discharge of the diaphram pump 110 may be back to the slurry holding tank. The connection to the slurry input, filterate discharge, compressed air and HVAC or atmosphere return lines is preferably through quick disconnect connectors 122, 124, 126 and 128. The filtrate lines 22 and 24 are connected to the top of the water separation reservoir 106 by way of valves 130 and 132.

The process is initiated by filling the vessel 10 with the powered media slurry through the pipe 118 and the valve 120. The slurry is pumped or discharged under gravity pressure directly onto the top of the pipe 60 over the top filter panel array 40. The filling with slurry causes considerable turbulence and militates against blinding of the filter panel surface areas, which may occur if the population of fines in the slurry is high. It is desirable to begin vacuum filtration before the slurry settles. By keeping the filter arrays above the bottom 13 of the vessel 10, blinding is minimized. Filling continues while the level display 36 is observed. When the vessel is filled, the slurry input valve 120 is closed. The vacuum pump is turned on and the valves 130 and 132 are opened. The vent valve 116 remains open during filling and vacuum filtration.

The vacuum pump is then turned on and water is drawn from the slurry through the filter panels and the filter discharge tubes 80 and 78 into the reservoir 106. When the reservoir 106 fills to the level which causes the level element LE and switch LS 108 to trip, the compressed air is applied to the pump 110 and the filterate is discharged back to the slurry holding tank. The process continues until a substantial cake builds up in the vessel. The cake grows around the filter fins 44 and then falls away from the filters either from its own weight or as flow of water diminishes. If necessary, the connections to the vacuum pump may be reversed to back flush and release cake which then falls to the bottom of the liner vessel 10. Most of the filtering occurs in the top array 40. For some slurries, it is preferable to use only one top filter array principally located in the upper part of the liner 10, for example, as shown in the embodiment of the apparatus illustrated in FIGS. 4 to 7.

The reduction in flow due to vacuum filtration will be indicated by the level display 36, because the level sensor will show little change in level and indicate the level of essentially wet cake left in the vessel 10. Of course, if flow ceases and the vacuum pump 100 merely pumps air, and the pressure indicated by gauge 101 returns toward atmospheric pressure, this will indicate that the limit of vacuum filtration has been reached. Therefore, the level display 36 and/or the absence of any filterate discharge can be taken as a signal to initiate the next phase of the process.

Then, the valve 116 in the vent line 28 is closed. The slurry input valve 120 is also closed at the initiation of the next phase in the process. Vacuum is therefore applied to the inside of the bag 90. The vacuum path is the same as during vacuum filtration. However, the vent is closed at the valve 116. Therefore, air is exhausted from the bag 90. The bag collapses to the surface of the cake and transmits atmospheric pressure to the cake surface. The variable volume region defined by the bag around the cake has decreased in size. Atmospheric pressure is allowed to be transmitted to the surface of the cake through the porous plug 94. The vacuum pump 100 continues to evacuate the bag through the filter fin arrays 40 and 42. At about 24" of mercury pressure, as indicated at gauge 101, the cake is compressed by the bag which encompasses its exterior surface to about 12 lbs. per square inch. The bag in effect provides the seal which had, until the water flow ceased, been provided by the water in the slurry or cake. Such compression can continue for several hours, for example, four to five hours. The compression forces the free water through the filter panels and out through the discharge pipe 60 into the reservoir where it is discharged to the holding tank by the diaphragm pump 110.

After a cycle of compression there remains additional volume in the liner vessel 10 which can be filled with more slurry. The cycle can then be repeated until the liner vessel is completely filled with dewatered slurry.

Figure 4:
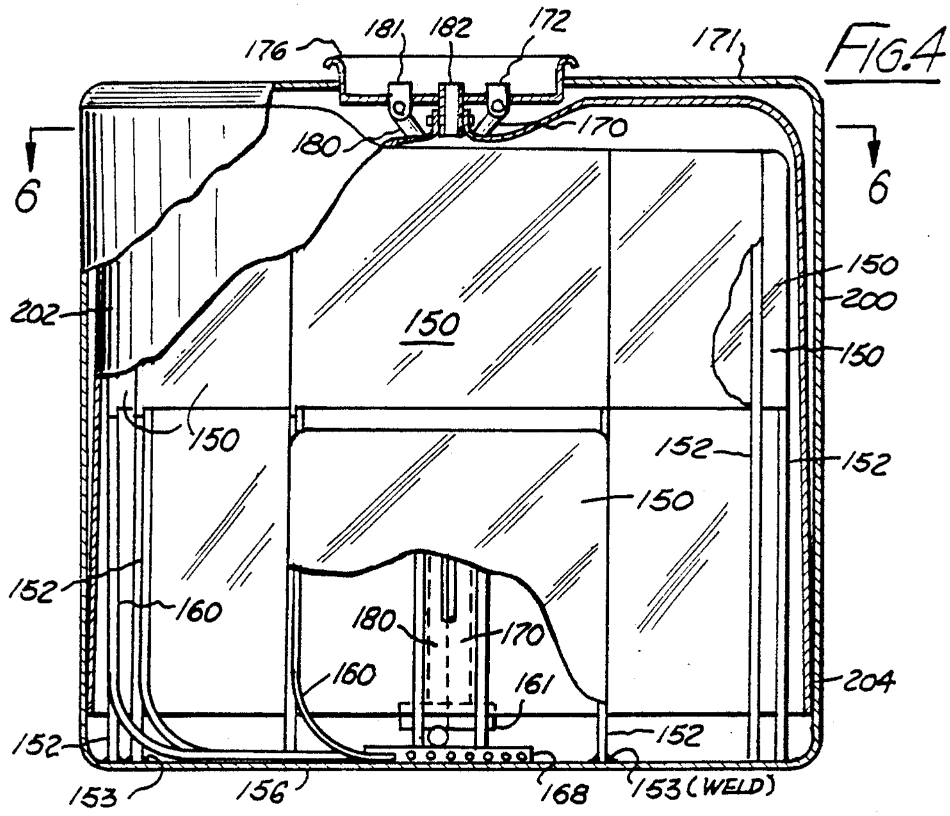
FIG. 4 is a elevational front view of a liner vessel constructed in accordance with another embodiment of the invention, the view being broken away to illustrate the vessel's internal construction.
Figure 5:
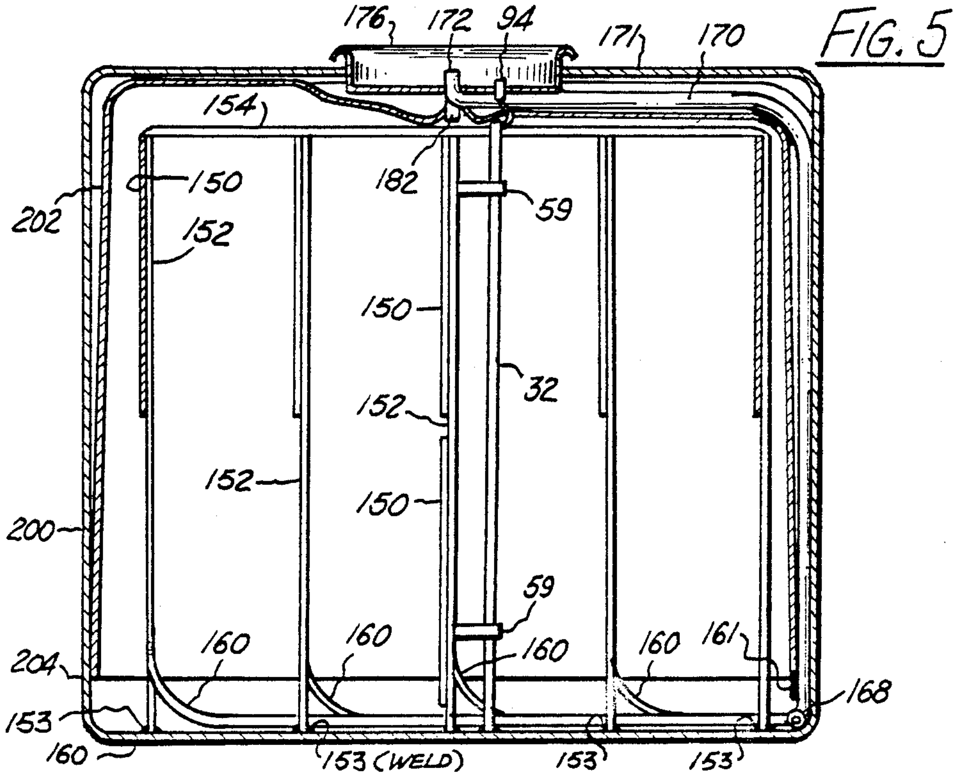
FIG. 5 is a elevational side view, taken from the right as viewed in FIG. 4 and along line 5—5 in FIG. 6, of the liner vessel and its internals which are shown in FIG. 4, the view also being broken away to show the internals.

Referring to FIGS. 4 to 7, there is shown another embodiment, with like parts identified by like reference numerals, of the invention wherein the filter panels 150, which are of a design similar to the panels illustrated in FIGS. 3 and 4, are assembled to "A" frames 152 which stand on (welded at 153 to) the bottom 156 of the liner vessel 200. These filter panels are parallel to each other. The frames are held in alignment by tie-bars 154. Drain tubes 160 are connected to and extend along the edges of the panels as indicated in FIG. 7. The tubes 160 have apertures 162 internally of the panels. The tubes 160 are brought out along the side of the vessel 200 under a guard plate 161. The vessel 200 may be equipped with slurry fill lines 180 and a fill coupling 181 which provides high velocity flow at the top of the vessel around the panels to increase turbulence by an upward extension of the fill line 180 (not shown). The discharge tubes 160 may be coupled to a discharge manifold 168, which is connected via a discharge pipe 170 to a coupling nipple 172 in a sealable cup 176 (like the cup at 14 in FIG. 1) at the top 171 of the vessel 200. A vent 182 and its coupling are also located at the top 171 of the vessel 200. The couplings 172, 181 and 182 may be quick-release couplings which can be connected to the fill, vent and discharge tubes 20, 28, 22 and 24, as shown in FIG. 1.

The filter panel array is surrounded by a bag of pliant material. The bottom of the bag 202 is open and may be sealed along its bottom edge 204 to the walls of the vessel 200. The seal may be provided by adhesive. The neck of the bag is connected to the vent tube.

The process of using the apparatus illustrated in FIGS. 4 to 7 may be the same as described above in connection with FIG. 1 and the same pumps, reservoir and piping may be used.

From the foregoing description it will be apparent that there has been provided an improved system (methods and apparatus) for removing liquid from a slurry, and particularly to an improved system for dewatering of powder, resins and filterate material which are used for water conditioning and filtration purposes in nuclear power plants. While two embodiments of the invention have been described, together with equipment and techniques for practicing the invention, it will be appreciated that variations and modifications in the above-described equipment and techniques, within the scope of the invention, will undoubtedly become apparent to those skilled in the art. Accordingly, the foregoing description should be taken as illustrative and not in a limiting sense.

I claim:

1. The method of removing liquid from and compacting a slurry of liquid/particulate material in a vessel which comprises the steps of forming a body of said particulate material upon a filter through which said liquid is withdrawn by applying suction to extract said liquid through said filter, compressing said body in a direction towards said filter while continuing to withdraw liquid through said filter in response to the suction, said compressing step comprising defining a chamber of variable volume in said vessel around said filter and said body, and reducing the volume of said chamber in response to the suction to compress said body.

2. The method according to claim 1 further comprising the evacuating said chamber to provide the suction which withdraws the liquid through the filter and to reduce said volume.

3. The method according to claim 2 further comprising surrounding said body and filter with a bag of pliant material, and evacuating said bag through the filter in response to the suction to reduce said volume and withdraw the liquid.

4. The method according to claim 3 further comprising pumping said liquid out of said vessel through said filter until said particles define a cake, initiating said evacuating step when the flow of liquid through said filter ceases, and continuing said pumping.

5. The method according to claim 4 further comprising the steps of terminating the evacuating of said bag and refilling the volume of said vessel within said bag after said body is compressed, then repeating said evacuating step thereby increasing the volume of said vessel containing said body.

6. The method according to claim 4 wherein said particulate material is powder having an average size of from 30 to 50 microns.

7. The method according to claim 6 wherein said material of which said powder consists is ion exchange media spent in the filtering or decontamination of water in a nuclear power plant.

8. Apparatus for dewatering of a slurry containing powder material which comprises a container adapted to be filled with said slurry, means in said container for permitting the passage of water out of said container while forming a body of said wet powder in said container, means defining a variable volume region in said vessel about said body for compressing said body against said water passage permitting and forming means and maintaining said body in water communicating relationship therewith, and means for applying suction through said passage permitting means for reducing said volume while withdrawing water from said body via said water passage permitting and forming means.

9. The apparatus according to claim 8 wherein said passage permitting means is a filter.

10. The apparatus according to claim 9 wherein said variable volume region includes said filter therein.

11. The apparatus according to claim 10 wherein said variable volume defining means is a bag of pliant material.

12. The apparatus according to claim 11 further comprising means for evacuating said bag, apply the suction and to reduce the volume of said region.

13. The apparatus according to claim 12 wherein said bag consists of polyethylene material.

14. The apparatus according to claim 11 wherein said container has an upper portion and a lower portion between the bottom of said container and upper portion, said apparatus further comprising means supporting said filter in the upper portion of said container, and means for directing the flow of said slurry into said container towards said filter.

15. The apparatus according to claim 11 wherein said filter comprises an array of panels in said vessel.

16. The apparatus according to claim 15 wherein said panels have conduit means communicating therewith through which water filtered by said panels can flow.

17. The apparatus according to claim 15 wherein said panels are disposed vertically in said container.

18. The apparatus according to claim 17 wherein said panels are disposed in a radial array and have inner and outer ends, a pipe for the discharge of said water extending vertically in said container and centrally of said array, and said pipe being in fluid communication with said inner ends of said panels.

19. The apparatus according to claim 17 wherein said panels are disposed generally in parallel spaced relationship, said panels have lower edges, and tubes in communication with said panels along said lower edges thereof for the discharge of said water filtered by said panels.

20. The apparatus according to claim 17 wherein said panels are flexible and moveable spirally about said pipe to confine said panels within a radius less than the length thereof when fully extended in a direction radially of said pipe.

21. The apparatus according to claim 15 wherein said bag has a top, a side wall and a bottom, said bag having an edge at the intersection of said bottom and said side wall, said edge being secured in sealed relationship with the inner periphery of said vessel, said bottom being open, said top extending over said body, and a coupling for applying suction to said bag.

22. The apparatus according to claim 21 wherein said coupling is disposed centrally of said bag from said top thereof.

23. Apparatus for dewatering a slurry of water and powder particulate material which comprises a vessel having an upper portion and a lower portion between the bottom and upper portion thereof, means for filtering water from said slurry disposed exclusively in the top portion thereof, means for filling said vessel with slurry into said upper portion towards said filtering means, said filtering means comprising an array of panels vertically disposed in said vessel which extend radially about an axis which extends vertically of said vessel, and a pipe extending along said vertical axis, said panels having interior ends connected in fluid communicating relationship to said pipe.

24. The apparatus according to claim 23 wherein said panels are flexible and moveable along spiral paths against said pipe to define a diameter less than the diameter of said panels when radially extended whereby to enable said pipe and panels to be installed in said container through an opening smaller than the diameter of said vessel.

25. Apparatus for dewatering a slurry of water and powder particular material which comprises a vessel and an array of water filtering panels which extend radially about an axis which extends vertically of said vessel, means in communicating relationship with said panels for withdrawing the water from said slurry through said panels, and said panels being flexible and movable along spiral paths about said axis to define a diameter less than the diameter of said panels when radially extended whereby to enable said array to be installed in said vessel through an opening smaller than the diameter of said vessel.

26. The apparatus according to claim 25 wherein a pipe extends along the vertical axis, said panels having interior ends connected in fluid communicating relationship to said pipe.

* * * * *